(No Model.)

J. D. MATTISON.
COMBINED BOTTLE STOPPER AND FAUCET.

No. 311,080. Patented Jan. 20, 1885.

WITNESSES:

INVENTOR:
James D. Mattison
By his Attorneys,
Burke, Fraser

UNITED STATES PATENT OFFICE.

JAMES D. MATTISON, OF NEW YORK, N. Y.

COMBINED BOTTLE STOPPER AND FAUCET.

SPECIFICATION forming part of Letters Patent No. 311,080, dated January 20, 1885.

Application filed May 9, 1884. (No model.)

*To all whom it may concern:*

Be it known that I, JAMES D. MATTISON, a citizen of the United States, residing in the city, county, and State of New York, have invented an Improved Combined Stopper and Faucet, of which the following is a specification.

My invention relates to that class of combined stoppers and faucets wherein the stopper is seated and unseated by means of a screw or its equivalent.

The novel features of the invention will be fully described hereinafter and defined in the claims.

Figure 1:
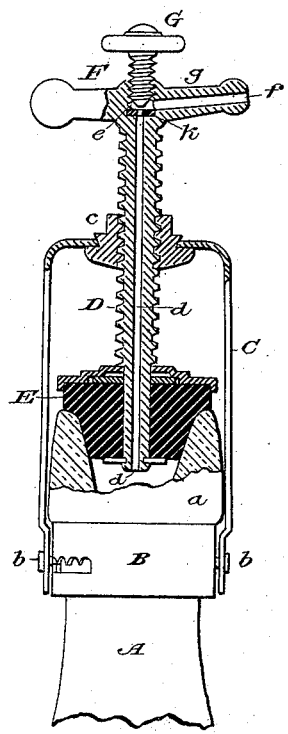
Figure 2:
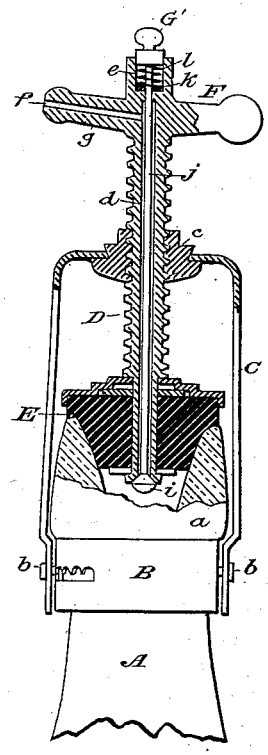

In the drawings, which serve to illustrate my invention, Figure 1 is a vertical mid-section of my combined stopper and faucet in its most approved form. Fig. 2 is a similar section illustrating a modification of the faucet, the stopper being essentially the same as that shown in Fig. 1.

Referring to Fig. 1, A represents the neck of an ordinary bottle having the usual fillet, a.

B is a removable clamping or securing band, which is or may be constructed like that shown in my Letters Patent No. 291,920, of January 15, 1884. To the said band B is hinged at b b a bail, C, the cross-piece of which is provided with a nut, c, to receive a stopper-screw, D. On the end of screw D is secured the stopper E, which I usually make of rubber.

F is a cross-handle on the top of screw D, whereby the latter may be turned and the stopper screwed down to its seat in the mouth of the bottle. When the stopper is raised above the mouth of the bottle, the bail and all the parts borne by it may be turned over to one side, so as to permit the contents of the bottle to be poured out. This form of screw-stopper has been long in use, and I do not claim it, broadly, herein.

In order to provide the stopper with a faucet, I proceed as follows: The screw D is provided with a bore or passage, d, which passes entirely through the screw lengthwise, the upper end terminating in an internally-screw-threaded cavity, e, in the top of the screw D. Another lateral passage, f, is formed in a branch, g, of the cross-handle, and this passage also enters the cavity e at the side.

G is a screw, which may be screwed down upon the upper end of passage d, so as to close it. To facilitate this closure a rubber packing, k, may be placed at the bottom of cavity e. When the screw G is turned back, as shown in drawings, the fluid in the bottle may pass up through d and out at f; but when it is screwed down the upper end of passage d is closed and no fluid can escape. The end of screw G might be flat; but I prefer to make it conical, as shown, in order that it may enter the aperture in the rubber packing and expand it against the walls of the cavity e; or I might omit the packing and construct the coned end of the screw to seat itself in the coned valve-seat in the bottom of e.

In Fig. 2 I have shown the same stoppering device as that shown in Fig. 1; but the faucet is constructed differently. Here the passage d in screw D is somewhat larger, and a valve-seat is formed in its lower end to receive a valve, i, on a stem, j, which passes up through d, and has a head, G'.

In a socket, e', in the top of screw D is placed a packing, k, and a spring, l, which is arranged between the said packing and the head G'. This spring serves to keep valve i up to its seat. By pressing down on head G' the valve is depressed and passage d opened for the flow of the fluid from the bottle. Where the fluid is aerated, the pressure from within would keep the valve in place without the spring; but for wines and non-aerated fluids the spring is necessary.

In lieu of the screw D for forcing the stopper down to its seat, I may employ as an equivalent a rack formed on the stem of the stopper, a pinion mounted in a lock-case through which the stem passes, and a locking device. Such a means for actuating and locking the stopper is shown in my patent before mentioned, and does not require to be illustrated herein.

Having thus described my invention, I claim—

1. The combination, with the retaining-collar, the swiveled bail, the nut, the stopper, and its tubular branched retaining-screw, of the means, substantially as described, for opening and closing the passage in said screw, all arranged to operate as set forth.

2. The combination of the retaining-collar, the swiveled or hinged bail, the nut, the stopper, the screw D, provided with the passage $d$, recess $e$, and branch $g$, with passage $f$, and the screw G, all constructed and arranged to operate substantially as set forth.

In witness whereof I have hereunto signed my name in the presence of two subscribing witnesses.

JAMES D. MATTISON.

Witnesses:
HENRY CONNETT,
ARTHUR C. FRASER.